April 15, 1941.　　　G. T. HART, JR　　　2,238,053
ART OF JOINING PARTS
Filed Sept. 20, 1938　　　4 Sheets-Sheet 1

INVENTOR
George T. Hart, Jr.
By his Attorney
Victor Cohl

April 15, 1941.   G. T. HART, JR   2,238,053
ART OF JOINING PARTS
Filed Sept. 20, 1938   4 Sheets-Sheet 2
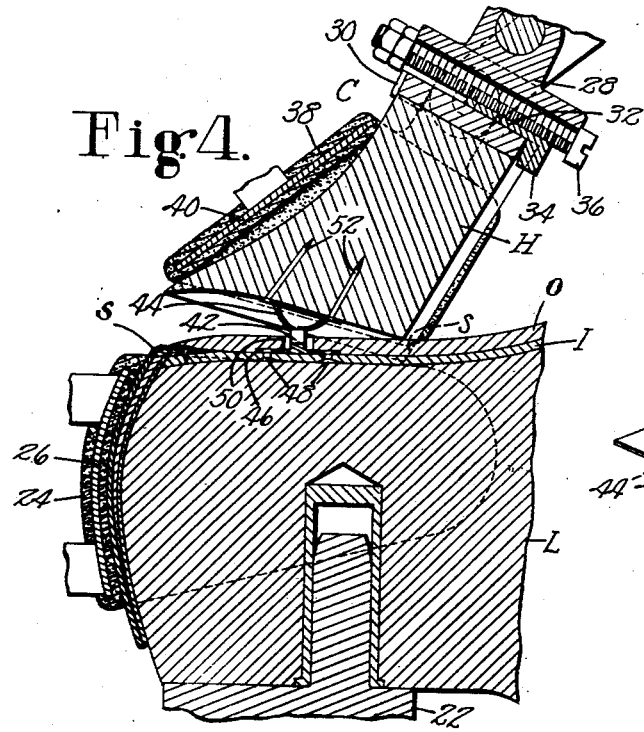
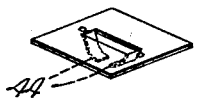
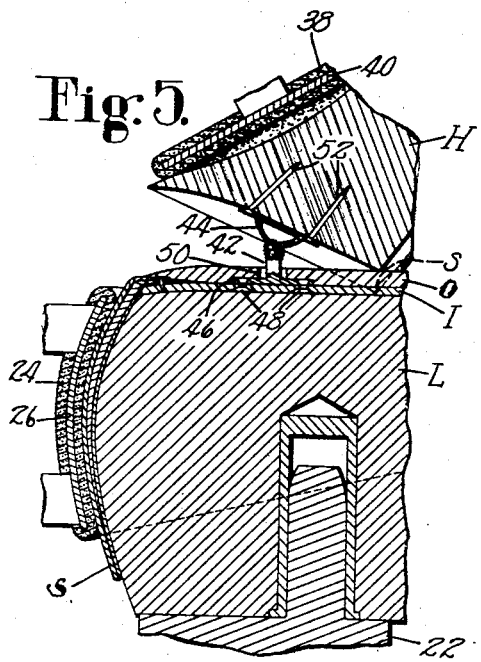
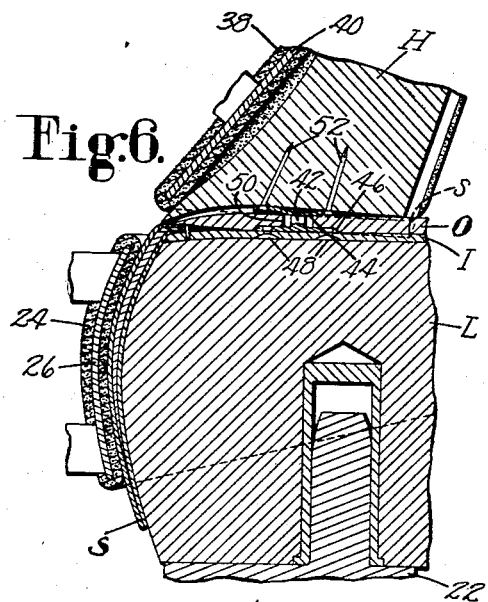
INVENTOR
George T. Hart, Jr
By his attorney
Victor Colib.

April 15, 1941.  G. T. HART, JR  2,238,053
ART OF JOINING PARTS
Filed Sept. 20, 1938  4 Sheets-Sheet 3
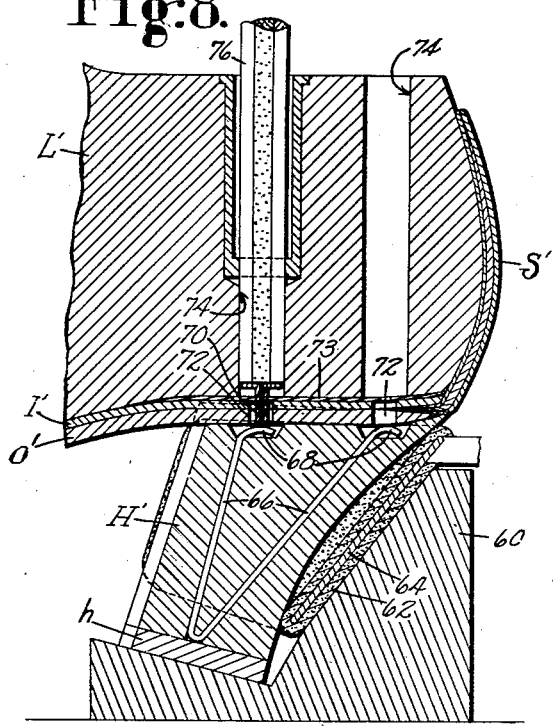
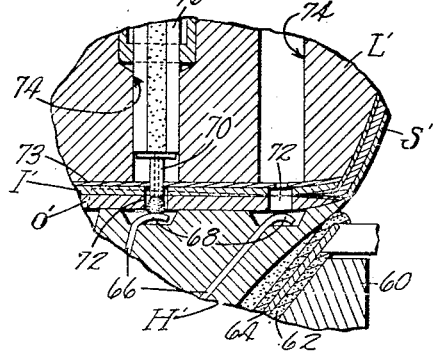
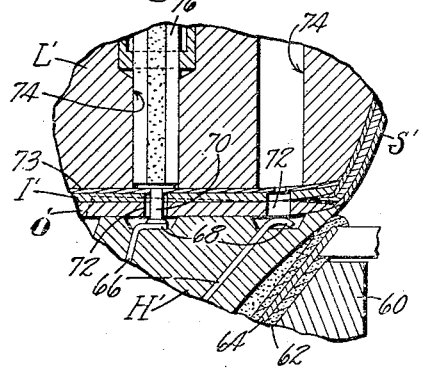

April 15, 1941. G. T. HART, JR 2,238,053
ART OF JOINING PARTS
Filed Sept. 20, 1938 4 Sheets-Sheet 4
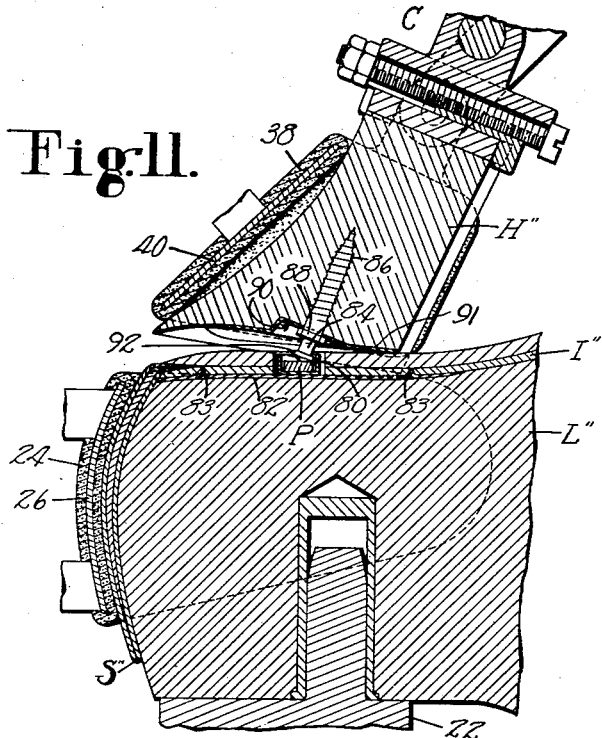
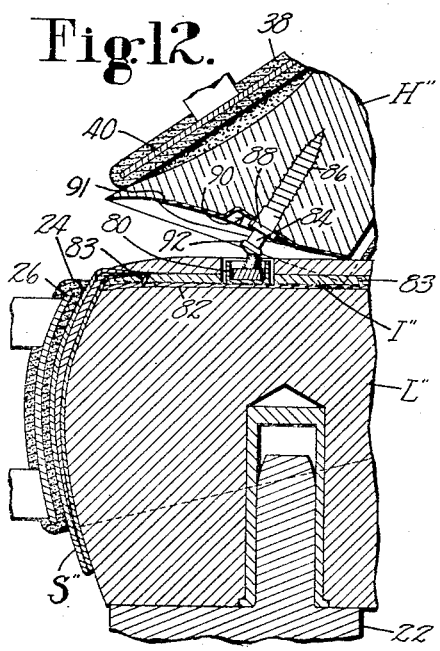
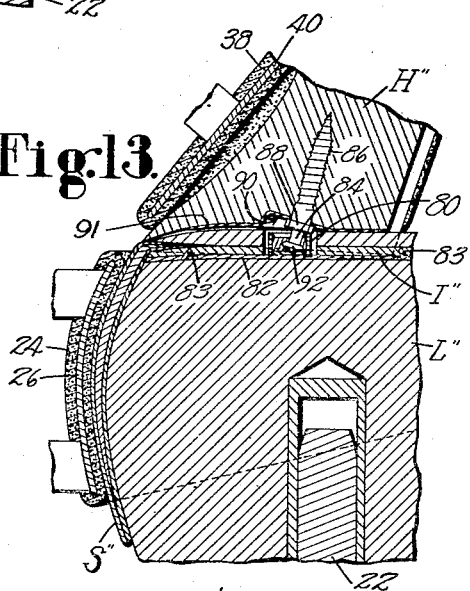
INVENTOR
George T. Hart, Jr.
By his Attorney
Victor Colb.

Patented Apr. 15, 1941

2,238,053

UNITED STATES PATENT OFFICE 2,238,053

ART OF JOINING PARTS

George T. Hart, Jr., Lynn, Mass., assignor to United Shoe Machinery Corporation, Borough of Flemington, N. J., a corporation of New Jersey Application September 20, 1938, Serial No. 230,835

35 Claims. (Cl. 12—147)

This invention relates to the joining of parts or their preparation for such joining by heating. It may be applied to such treatment of the parts for welding or for connecting them by a fused metal. It is of a special utility as applied to the attachment of heels to shoes by metallic members, though in no sense limited to this use.

An object of the invention is to bring about the connection by heat effectively produced and which may be applied readily at relatively inaccessible points, it being concentrated where its effect is desired and producing secure attachment without danger of injuring the parts.

A feature of the invention whereby the above object may be attained resides in a method of softening metal or other material which consists in heating it by the action of an arc formed by and in an electrostatic field. This softening may be carried to a degree which is a suitable preparation for welding the heated parts by forcing them together, or it may be applied to the melting of a connecting metal, alloy or solder which is then allowed to solidify to join the parts. As herein employed, the term "solder" is to be understood as comprehending the use of any connecting metal or combination of metals. Preferably, contact is established between the parts in the field, after which they are separated sufficiently to form the arc, which produces its heating action directly at the portions to be joined. Thereafter, sufficient heat having been generated, the parts are again brought into contact with a force which causes them to be joined, the arc ceasing at the same time. The electrostatic stresses generating the arc may be transmitted to the parts to be united from terminal electrodes considerably removed from said parts and with interposed insulating material, thus permitting the welding of metallic articles which are substantially surrounded by a non-metallic substance except at the point of welding contact. Since the heat produced by the electrostatic field in objects within it is negligible when the electrical conductivity of the object is appreciable, the heating will be confined to the immediate vicinity of the arc. The energy required to set up the electrostatic arc-producing field is small; the manipulation of the parts is simple; and the pressure required between the heated parts to be attached is no more than that necessary to join them. Because the effect of the electrostatic field may be transmitted through the body of an operator without discomfort, a part to be operated upon may be held in the hand, the strength of the useful field being greater and still further increased if the connection between the hand and the part is conductive. In this way the manipulation of small parts is greatly facilitated.

In the employment of the method for attaching heels to shoes, interposed material, such as opposite members in these parts, is heated in an electrostatic field and when in the proper condition, the heel, shoe and material are forced together to effect the attachment. The connection between metal heel-attaching members may be by welding or soldering, the general procedure being as already outlined. The shoe and heel are best positioned for the operation upon them by the terminal devices or electrodes of the electrostatic field, and the heel may be gaged further in its relation to the heel-seat, as by contact of its breast-edge with the breast-shoulder, the heel being moved into position to establish contact between the members, moved reversely to form the arc and then back again to connect the members. In welding, one of the opposite members may be deformable readily, this allowing the connection to adjust itself to the space between the heel-seat of the shoe carrying one member and the cup of the heel from which projects the other member. In soldering the connection between the members, the solder which is to be fused by the heat of the arc may be placed in a cup or receptacle secured to one of the shoe-parts, while a metallic projection from the other shoe-part is adapted to enter the cup and the fused solder therein. Preferably, the position of the heel with relation to the heel-seat is first determined before the solder in introduced into the cup and the arc formed. A particularly efficient method of heel-attachment consists in providing a shoe with a metallic member in the heel-seat and a heel with a metallic member having portions diverging from the tread-end and projecting through the heel-cup, heating the members electrically, as by an electrostatic arc, and exerting pressure upon the heel and shoe to force the heated members together. By this method, the separation of the metallic member from the heel is rendered impossible and the heel itself is reinforced by the member against breakage. When attachment is to be effected at a plurality of points between the heel-seat and heel members, uniform heating by the arcs may be assured by forming these separately. Such members as studs may be brought into contact successively through openings in the heel-seat with spaced projections from the cup of the heel, one arc being created at a time, and the members connected pair by pair. Under proper conditions, however, it is entirely practical to make the plural connections simultaneously.

For carrying out my improved method for the attachment of heels to shoes, there may be utilized an arrangement in which the means for supporting and positioning the shoe and the means for holding the heel have associated with them at least one of the terminals of an electrical circuit. The source of an electrostatic field may be thus brought into close proximity with the work and without complicating the organization. Preferably the opposite terminals of the circuit are included in the shoe-positioning means as electrodes, as in a band-clamp associated with a shoe-supporting jack and in a co-operating heel-holder.

The practicing of the method of this invention leads to the production of still another feature. This consists of a shoe comprising an upper with its insole and its outsole, and metallic means which may be in the form of studs carried by the heel-seat, together with a metallic member having arms extending from the tread-end through the cup of the heel and joined to the heel-seat means, preferably by heat-produced connections. The heel member not only furnishes attaching means which cannot be separated from the heel by stresses received in the wear of the shoe, but it also strengthens the heel, preventing it from breaking.

The heel itself furnishes a further feature of the invention. In this heel are passages diverging from the tread-end to the cup, these passages being occupied by the arms of a metallic member, which arms extend from the tread-end through the passages and outside the cup. The projecting ends furnish the means for attaching the heel to the metallic means in the heel-seat of the shoe, already referred to. The juncture of the arms at the tread-end secures the member positively against withdrawal through the heel and the spaced arms hold the heel against splitting either transversely or longitudinally of the axis.

In the accompanying drawings

Figs. 4, 5 and 6 are central, vertical, longitudinal sections illustrating one way of attaching a heel to a shoe in accordance with this invention;

Fig. 7 is a perspective view of one of the connecting members used in making the attachment of Figs. 4, 5 and 6; while Figs. 8, 9 and 10 and Figs. 11, 12 and 13 show respectively two other heel-attaching procedures.

Figure 1:
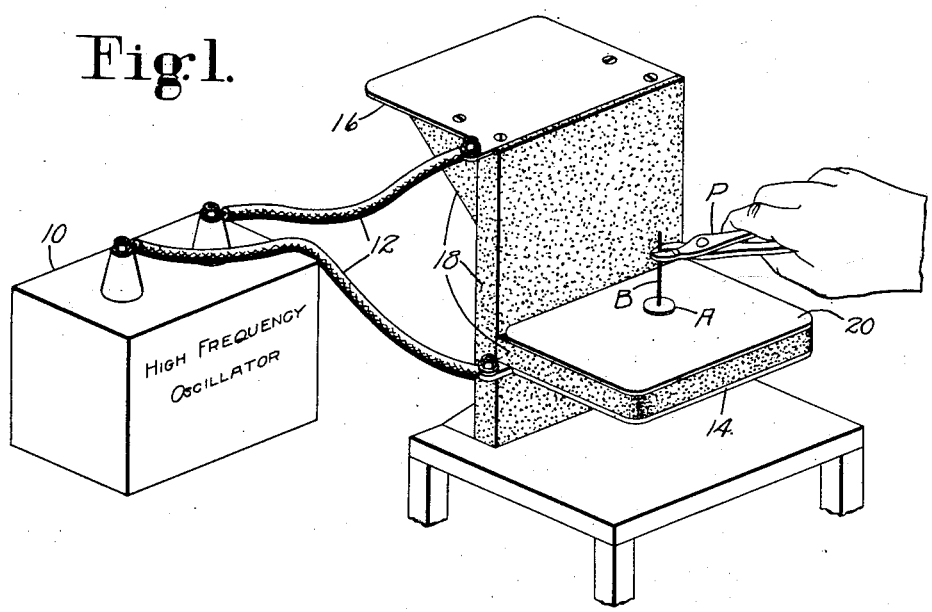
Figs. 1, 2 and 3 show in perspective successive operations particularly adapted for the connection, by my improved method, of small parts through direct manipulation by the operator.

At 10 in Fig. 1 of the drawings is indicated, in a conventional manner, a generator of high-frequency electrical oscillations. I have found in carrying out this invention that a frequency of from 2 to 20 megacycles a second may be used successfully, depending upon the conditions attending the particular case. These limits are not, however, to be considered as definitely fixed. From the opposite terminals of the generator conductors 12, 12 lead to electrodes 14 and 16. These are preferably in the form of horizontal plates carried at different levels and projecting in opposite directions from an insulating support 18. Between the two spaced electrodes is created an alternating electrostatic field, while they are so related that there may readily be introduced into this field parts A and B to be joined. Separated from the lower electrode 14 by a portion of the support 18 is a metal plate 20, serving as a rest for one of the objects being operated upon. This avoids changes in frequency of the oscillating circuit which would be caused by alteration in capacity of the electrode by direct contact of the object with it. The object A supported by the plate is shown as a disk of metal. The other object B appears as a metal rod held in the hand of the operator, preferably on conductive connection therewith, as by being grasped in metal pliers, and placed in contact with the disk.

Figure 2:
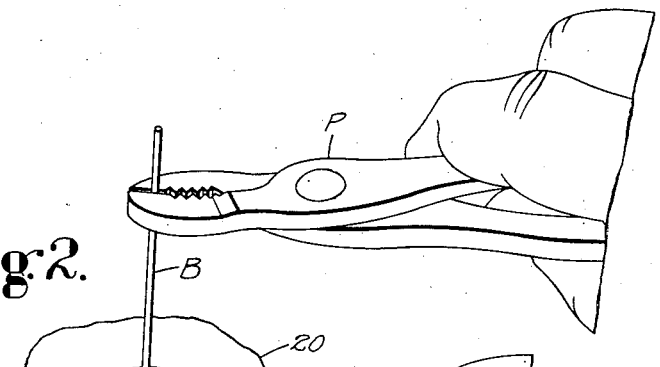
Figure 3:
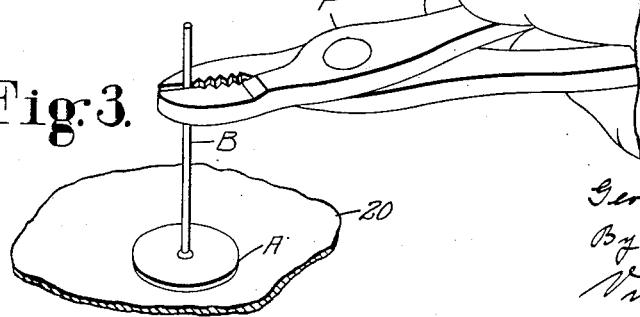

When a part is subjected to the action of the electrostatic field produced by the high-frequency generator 10, it will tend to be heated by the stresses set up in it, the degree depending upon the conductivity of the part. With metal objects such as have been assumed in the present instance to be under treatment, this heat would be negligible. I therefore increase the resistance of the path through which the electrostatic field is to act by separating the parts, in this case slightly raising the rod B (Fig. 2). An arc between the two objects will result, and this will heat and soften the adjacent portions. This action may be allowed to progress until upon forcing the softened portions together, as by lowering the rod B, the parts will be welded to each other (Fig. 3). The arc and the heating effect will cease, and the portions joined will cool and harden to complete the weld. The work may now be lifted from the plate 20 and removed from the field. Since the body of the operator is included in the electrostatic field, said field is more effectively concentrated through the parts being connected, especially if the hand of the operator is not electrically insulated from the part B. This procedure is of a special utility when applied to the joining of small parts, these being capable of ready and speedy manipulation without the use of holding mechanisms. It moreover gives the operator the ability to present the part held, in different directions to the other to meet the needs of particular cases and allows him to feel the weld so he may better know when it has reached the proper point and the work should be removed from the field.

My invention may be applied very effectively to the attachment of heels to shoes. One way of accomplishing this is illustrated in Figs. 4, 5, 6 and 7 of the drawings. At 22 appears the top of a jack-post, serving as a support for a shoe S upon a last L. The shoe has an attached insole I, an outsole O, and is held in a predetermined position upon the last-pin of the jack by a band-clamp 24 surrounding the counter-portion of the upper. Between the inner and outer layers of the band, which may be of leather, is one terminal device or electrode 26 of a high-frequency circuit. Movable above the jack, either manually or mechanically along a chosen path, is a heel-holder C. This may include a carrier 28 with spaced rear contact-projections 30 and a slidable tread-plate 32 having a depending flange 34 opposite the projections. Between the flange and the projections a heel H may be placed, with its tread-face against the plate 32 and clamped in place between the flange and projections by a screw 36. This screw is in threaded engagement with the tread-slide and has its head, and a nut upon the opposite extremity, bearing against the carrier. Depending from the carrier is a band 38 surrounding the rear and sides of the heel and extending from near the edge of the heel-cup toward the tread-end. This band, like the counter-clamp 24, may be of leather and carry within it the other terminal device or electrode 40 of the high-frequency circuit. The holder C may be guided, especially if it is to be moved manually, by contact between the breast-edge of the heel-cup and the breast-shoulder s of the outsole O at each side of the heel-tab. About this contact-line as a pivot the heel may be tilted toward and from the heel-seat.

As the heel is moved as above indicated, there are brought into registration and engagement metallic connecting members 42 and 44, which may be of iron or mild steel and secured in the heel-seat of the shoe and to the cup of the heel, respectively. The member 42 is shown as in the form of a projection from a plate 46 which is situated between the insole and the outsole and riveted at 48 to the former. This projection 42 passes through an opening 50 in the outsole, it being spaced from the walls thereof and extending beyond the outer surface of the outsole. The member 44 is more readily deformable than its companion, consisting of a convex loop of sheet-metal, shown as struck from a plate and divided at its center. It is fixed to the surface of the heel-cup by nails 52, 52 driven into the heel.

With the two electrodes 26 and 40 connected to the terminals of a high-frequency generator such as 10 (Fig. 1), the lasted shoe S supported upon the jack 22 within the band-clamp 24, and the heel H fixed in the holder C, said heel is located with relation to the heel-seat, as under the guidance of the breast-shoulder s. It is first tilted down until the loop 44 contacts with the projection 42 (Fig. 4) and then moved reversely to form an arc produced by the energy of the electrostatic field. This is as it appears in Fig. 5. The convexity of the loop at the center opposite the projection, and said projection itself, give reduced areas which concentrate and prevent the straying of the arc. This also tends to avoid undue loss of heat by conduction. The heat produced by the arc will soften both the members 42 and 44, and then, upon again lowering the heel and forcing the edge of the heel-cup firmly against the overlasted margin of the upper, the two members will be welded together, the arc being extinguished and the members cooled (Fig. 6). The end of the member 42 projecting from the heel-seat well into the cup of the heel may be slightly deformed by the welding pressure, while the more deformable loop member 44 will accommodate itself to whatever the distance it may be moved to insure firm seating of the heel upon the heel-seat and a consequently tight crease. Therefore, when the weld cools, with the loop surrounding the projection, a close attachment of the heel will be maintained securely. It is to be observed that the creation of heat by an electrostatic field to produce this heel-attaching weld requires no conductive connection between the electrodes and the metal members which are to be joined, and that these electrodes are of such a character that they may produce a dense field by being placed in close proximity to the members in the work-positioning means. Furthermore, because of the absence of any appreciable increase in temperature produced by the passage of the electrostatic field through parts of substantial electrical conductivity, metal objects included in the shoe, for example, lasting tacks, heel-seat nails and shank-reinforcements, will not be heated and so will not burn portions with which they contact.

The method of heel-attaching illustrated in Figs. 8, 9 and 10 provides connecting joints which are not only secure but include means increasing the strength of the heel. Here the heel-holding member takes the form of a rest 60 upon which the heel is placed, surrounded at its rear and sides by a band 62 in which is one electrode 64 united to a terminal of a high-frequency generator. The heel H' to be attached has through it passages diverging from a point near the center of the tread-surface and opening through the cup of the heel at points relatively close to the breast and the rear along the longitudinal axis of the shoe. These passages contain a rod or wire of substantial diameter bent to form two arms 66, 66, the angle between which lies at the juncture of the passages and is concealed by the top-lift h. The ends of the arms emerge through the passage-openings in the heel-cup, where they are bent back upon themselves to furnish rounded projections 68, 68. Since the simultaneous production of a plurality of arcs by the electrostatic field tends to distribute the heating energy unequally and thus leads to imperfect joints, the connections to the arms are preferably made successively, though this may not be necessary if a generating circuit of adequate power is employed. The cooperating connecting members in the shoe S' are shown as headed studs 70, the stems of which pass with some clearance through openings 72 in the insole I' and outsole O', in a manner resembling the preceding exemplification of the method as applied to heel-attaching. The heads of the studs are of such diameter that they are adapted to bear upon the insole or upon a reinforcing piece 73, which may be of fiber. The last L' in the shoe is shown as provided with two vertical passages 74, 74, one of which may be a continuation of the pin-hole. The passages register with the heel-seat-openings 72, and through them the studs are successively lowered into contact with the corresponding heel-projection 68. The studs are preferably of magnetic material, as iron or mild steel, and a holder 76 through which they are controlled may consist of a magnetized rod, of such diameter that it will enter the passages 74 and yet engage a considerable area of the stud-heads. This rod furnishes the second electrode of the high-frequency circuit.

In effecting the attachment, the heel H' with its member 66 is placed upon the rest 60 within the band 62 and electrode 64. The heel-seat of the shoe S' is then positioned upon the cup of the heel and sufficient pressure applied to the cone of the last to insure a tight crease. A stud 70 is placed upon the end of the magnetic holder 76, to be carried thereby through one of the passages 74 until it contacts with the alined heel-projection 68 (Fig. 8). This is followed by the raising of the holder and stud to produce an arc between the separated members and resulting from the electrostatic field between the electrodes 64 and 76 (Fig. 9). The members softened by the heat of the resulting arc are thereupon forced together (Fig. 10) to weld them and interrupt the arc. The rounded portion 68 of the heel member 66 gives a somewhat reduced projection which is more quickly softened than is the stud and by its ready deformation adapts itself thereto to furnish a secure joint. One connection having been completed, the holder 76 is withdrawn and a second stud secured to the other arm of the member 66 to complete the attachment. This method of connection has the advantage of employing a member in the heel which cannot be separated therefrom by any force to which it will be subjected, which holds the heel-material in all directions against breakage and which allows the connecting points to be placed so close to the periphery of the heel-cup that opening of the crease in the wear of the shoe is resisted effectively. There are further provided plural connections, the condition of each of which is independent of the companion connections.

The heat created by the electrostatic field may be utilized for the purpose of fusing connecting metal, instead of softening the members to be united. The method may thus be applied to the making of a soldered joint. In Figs. 11, 12 and 13 of the drawings is illustrated this procedure applied to the attachment of a heel H" to a shoe S" carried by a last L". The supporting and positioning of the parts by the jack 22 and the heel-holder C, and the manner of localizing the electrostatic field by electrodes 26 and 40 in the counter-band 24 and the heel-band 38 may be as is shown in Figs. 4, 5 and 6. Through the heel-seat of the shoe near the center an opening is formed to receive a metal flange 80 projecting from a plate 82 and forming therewith a cup or receptacle. The plate is secured to the inner face of the insole I", for example, by prongs 83. From the cup of the heel is a projection 84 which will register with the cup 80 when the heel is correctly positioned upon the heel-seat of the shoe. The projection is furnished by the head-portion of a screw 86 set in the heel, the extent of projection from the heel-cup being determined by a flange 88 upon the screw, which is seated against a surface 90 of a steel plate 91 received in a recess in the cup of the heel. This surface 90 is substantially at right angles to the axis of the screw. At the end of the projection is a head or enlargement 92, which, when the heel is on the heel-seat, will occupy the cup 80.

In the performance of the method by this connection, the movements imparted to the heel H" to establish the arc under the influence of the electrostatic field between the counter-band and the heel-band may be the same as is shown in Figs. 4, 5 and 6. To enable the operator to locate the heel accurately upon the heel-seat before the connecting operation begins, the cup is best initially empty and the projection 84 and its head 92 may be moved laterally therein. Then, as the heel is tilted up, a piece P of some such fusible connecting material as solder is placed in the cup. Thereafter, the heel is moved down until the head 92 contacts with the solder (Fig. 11) and is raised to produce the electrostatic arc (Fig. 12). This is allowed to heat the projection and cup and fuse the solder. When the heel is forced down upon the heel-seat with the projection in the molten solder, the arc will be interrupted, the connecting members will cool, the solder harden, and the attachment be completed (Fig. 13). It is to be noted that the cup 80 and screw 86 are respectively so applied to the heel-seat and heel as to be maintained securely against withdrawal; that the solder is connected to the cup over a considerable area; and that it embraces the projection-end. The heel is therefore firmly held against displacement.

The apparatus for carrying out my method is not claimed herein since it forms the subject of my application Serial No. 336,751, filed May 23, 1940.

Having described my invention, what I claim as new and desire to secure by Letters Patent of the United States is:

1. The method of softening material which consists in heating the material by the action of an arc formed by the electric stress between the material and another surface at least one of which is within an electrostatic field.

2. The method of welding metal parts which consists in softening the parts by the action of an arc formed by the electric stress between said parts while they are positioned within an electrostatic field, and forcing the parts together to join them.

3. The method of soldering metal parts which consists in introducing solder between the parts, melting the solder and heating the parts by the action of an arc formed by the electric stress between said solder and a part located within an electrostatic field, and allowing the solder to solidify to join the parts.

4. The method of joining metal parts which consists in heating the parts by the action of an arc formed between them by the force of an electrostatic field while they are positioned within said field, one of the parts being held by the operator.

5. The method of joining metal parts which consists in heating the parts by the action of an arc formed between them by the force of electrostatic field while they are positioned within said field, one of the parts being held in conductive connection with the hand of the operator.

6. The method of welding metal parts which consists in supporting one of the parts in an electrostatic field, bringing another part to be welded to the first part and held by the operator into contact with that first named, separating the parts to form between them an arc to produce a welding heat, and forcing the parts together to join them.

7. The method of connecting electrically conductive parts which consists in establishing contact between the parts in an electrostatic field, separating the parts to form an arc, and forcing the parts together at the arcing points.

8. The method of connecting pieces of material which consists in positioning the pieces in an electrostatic field, producing in the pieces by such field an arc to produce a softening heat, and forcing the softened pieces together to join them.

9. The method of connecting metal parts which consists in positioning the parts in an electrostatic field, producing between the parts an arc dependent upon the electrostatic field, and forcing the parts together at the arcing points.

10. The method of connecting metal parts which consists in mounting said parts upon electrically nonconductive supports, creating an electrostatic field through the parts, establishing contact between said parts without producing heat therein, separating the parts to form an arc producing heat in adjacent portions, and forcing the heated portions together to join them and stop the production of the arc.

11. The method of welding metal parts which consists in positioning the parts in an electrostatic field, producing in the parts by such field heat sufficient to soften a part, and forcing the parts together to join them.

12. The method of soldering metal parts which consists in positioning in an electrostatic field adjacent portions of the parts with interposed solder, producing between such adjacent portions an arc dependent upon the electrostatic field and acting to melt the solder, and forcing together the portions with the melted solder.

13. The method of soldering metal parts which consists in positioning in an electrostatic field adjacent portions of the parts, supplying solder between such adjacent portions after they have been positioned, establishing connection between the parts at the supplied solder, separating the parts to form an arc acting to melt the solder and heat the portions, and forcing together the heated portions with the melted solder.

14. The method of attaching heels to shoes by opposite metallic members which consists in heating the members by the action of an electrostatic field, and forcing the heated members together.

15. The method of attaching heels to shoes by interposed material which consists in heating the material by the action of an electrostatic field, and thereafter forcing the heel, shoe and material together.

16. The method of attaching heels to shoes which consists in securing to the heel-seat of a shoe and to a heel oppositely arranged metallic members, positioning the heel upon the shoe in an electrostatic field with the opposite members in contact, separating the members to form an arc heating them, and forcing the heel and shoe together to join the heated members.

17. The method of attaching heels to shoes which consists in securing to the heel-seat of a shoe and to a heel oppositely arranged metallic members, positioning the heel upon the shoe in an electrostatic field with the opposite members in contact, separating the members to form an arc softening them, and exerting pressure upon the heel and shoe to force the softened members together and thereby weld them.

18. The method of attaching, to shoes having metallic members in the heel-seats, heels provided with metallic members diverging from the tread-end and projecting through the cup which consists in positioning a heel upon the heel-seat of a shoe with the projecting ends of the members in contact with the heel-seat members, creating an electrostatic field through the contacting members, separating the members to form arcs to soften adjacent portions of the separated members, and forcing the heel and shoe together to weld the softened portions.

19. The method of attaching heels to shoes which consists in securing a stud in the heel-seat of a shoe, securing to the cup of a heel a loop of sheet-metal, heating the stud and loop, and forcing the heated stud and loop together to connect them.

20. The method of attaching heels to shoes which consists in securing a stud in the heel-seat of a shoe, securing to the cup of a heel a loop of sheet-metal, positioning the heel upon the heal-seat of the shoe with the loop in contact with the end of the stud, creating an electrostatic field through the contacting members, separating the members to form an arc to soften adjacent portions of the separated members, and forcing the heel and shoe together to weld the softened portions.

21. The method of attaching, to shoes having openings in the heel-seats, heels provided with a plurality of metal projections at the cups which consists in positioning a heel and the heel-seats of a shoe with the projections registering with the openings, creating an electrostatic field through the projections, successively bringing into contact with the respective projections metallic members through the corresponding heel-seat-openings, separating each member from its projection to form an arc heating the thus-separated portions, and forcing the heated portions together to join them.

22. The method of attaching to lasted shoes having openings in the heel-seats heels provided with a plurality of metal projections at the cups, the lasts within the shoes having passages alined with the heel-seat-openings which consists in positioning a heel and the heel-seat of a shoe with the projections registering with the openings, creating an electrostatic field through the projections, successively bringing into contact with the respective projections metal studs through the corresponding last-passages and heel-seat-openings, separating each stud from its projection to form an arc heating the thus-separated members, and forcing the heated members together to join them.

23. The method of attaching to shoes having openings in the heel-seats heels provided with metal projections at the cups which consists in positioning a heel and the heel-seat of a shoe with a projection registering with an opening, creating an electrostatic field through the projection, bringing into contact with the projection through the heel-seat-opening a stud of magnetic material carried by a magnet, retracting the magnet to form an arc heating the thus-separated members, and forcing the magnet toward the heel to join the members.

24. The method of attaching to shoes having openings in the heel-seats heels provided with a plurality of metal projections at the cups which consists in positioning a heel and the heel-seat of a shoe with the projections registering with the openings, creating an electrostatic field through the projections, successively bringing into contact with the respective projections through the corresponding heel-seat-openings studs of magnetic material each carried by a magnet, retracting the magnet to form an arc heating the thus-separated members, and forcing the magnet toward the heel to join the members.

25. The method of attaching heels to shoes which consists in securing to the heel-seat of a shoe and to a heel oppositely arranged metallic members, providing solder between the members, positioning the heel upon the shoe with the opposite members and solder in contact, creating an electrostatic field through the members, separating the members to form an arc fusing the solder, and forcing the heel and shoe together to interrupt the arc and allow the solder to cool.

26. The method of attaching heels to shoes one of which parts carries a metal receptacle and the other a metal projection positioned to enter the receptacle which consists in providing solder in the receptacle, heating the receptacle, the projection and the solder to fuse said solder, and forcing the heel and shoe together while allowing the solder to cool.

27. The method of attaching heels to shoes which consists in securing to the heel-seat of a shoe a metal cup, securing to the heel-seat-end of a heel a metal projection positioned to enter the cup, gaging the heel upon the heel-seat, providing solder in the cup, heating the cup, the projection and the solder electrically to fuse said solder, and forcing the heel and shoe together while allowing the solder to cool.

28. The method of attaching heels to shoes which consists in positioning under the guidance of electrode terminal devices a shoe and a heel having opposite metallic members adapted to be brought into contact, establishing between the terminal devices an electrical field heating the members, and forcing the heel and shoe together to connect the heated members.

29. The method of attaching heels to shoes which consists in positioning under the guidance of terminal devices a shoe and a heel having opposite metallic members, establishing between the terminal devices an electrostatic field with the opposite members in contact, moving the terminal device with the heel away from the shoe and its terminal device to separate the members and form an arc, and moving the heel and its terminal device toward the shoe and its terminal device to connect the members.

30. The method of attaching heels to shoes which consists in locating a heel with respect to the heel-seat of a shoe by engagement of the breast-edge of the heel-cup with the breast-shoulder at the heel-seat, such heel and shoe being provided with opposite metallic members, creating an electrical field through the members, tilting the heel toward the heel-seat about the breast-shoulder to bring the members into contact, tilting the heel outwardly to separate the members and produce an arc between them, and again tilting the heel toward the heel-seat to connect the members.

31. A shoe comprising an upper with its insole and outsole, metallic means carried by the heel-seat of the shoe, and a heel provided with a metallic member having arms extending from the tread-end through the cup of the heel and joined to the heel-seat means.

32. A shoe comprising an upper with its insole and outsole, metallic means carried by the heel-seat of the shoe, and a heel provided with a metallic member having arms extending from the tread-end through the cup with welded connections to the heel-seat means.

33. A shoe comprising an upper with its insole and outsole through which are openings, studs projecting through the openings, and a heel provided with a metallic member having arms diverging from the tread-end, the ends of said arms being spaced from front to back of the shoe as they emerge through the cup with welded connections to the studs.

34. A heel provided with a plurality of passages diverging from the tread-end to the cup, and a metallic member having arms extending from the tread-end through the passages and outside the surface of the cup.

35. A heel provided with a plurality of passages diverging from the tread-end to the cup, and a metallic member having arms spaced lengthwise of the cup extending from the tread-end through the passages with the end of each arm bent back toward the surface of the cup.

GEORGE T. HART, JR.